(12) United States Patent
Harris (10) Patent No.: US 11,007,940 B1
(45) Date of Patent: May 18, 2021

(54) DETACHABLE REAR-VIEW MIRROR

(71) Applicant: August Harris, San Francisco, CA (US)

(72) Inventor: August Harris, San Francisco, CA (US)

( * ) Notice: Subject to any disclaimer, the term of this patent is extended or adjusted under 35 U.S.C. 154(b) by 311 days.

(21) Appl. No.: 16/140,756

(22) Filed: Sep. 25, 2018

Related U.S. Application Data (60) Provisional application No. 62/562,868, filed on Sep. 25, 2017.

(51) Int. Cl.
*G02B 7/182* (2021.01)
*B60R 1/078* (2006.01)

(52) U.S. Cl.
CPC .................................. *B60R 1/078* (2013.01)

(58) Field of Classification Search
CPC .. B60R 1/02; B60R 1/025; B60R 1/12; B60R 1/1207; B60R 1/1215; B60R 1/1246; B60R 1/04; B60R 1/072; B60R 1/06; B60R 1/062; B60R 1/074; B60R 1/076; B60R 1/078; B60R 1/0615; B60R 1/0625; B60R 2011/0033; B60R 2011/0026; B60R 11/04; G02B 7/182; G02B 7/198; G02B 7/1824; G02B 7/1822; G02B 7/1825; G02B 7/1827; G02B 7/1828; B60Q 3/258; B60Q 1/2665
USPC .......................................................... 359/872
See application file for complete search history.

(56) References Cited

U.S. PATENT DOCUMENTS

| | | | | |
|---|---|---|---|---|
| 5,100,095 A | * | 3/1992 | Haan ......................... | B60R 1/04 248/483 |
| 2002/0011365 A1 | * | 1/2002 | Sasaki ..................... | E05B 83/16 180/69.2 |
| 2007/0246967 A1 | * | 10/2007 | Lynam .................... | B60J 5/0411 296/146.1 |
| 2012/0310519 A1 | * | 12/2012 | Lawlor ..................... | B60R 1/12 701/301 |

FOREIGN PATENT DOCUMENTS

WO    WO-2016204969 A1 * 12/2016  ............. B60R 1/078

* cited by examiner

Primary Examiner — William R Alexander
Assistant Examiner — Tamara Y. Washington
(74) Attorney, Agent, or Firm — Fish & Richardson P.C.

(57) ABSTRACT

A detachable rear-view mirror includes an exterior component, an interior component, and a strap. The exterior component includes a mirror portion that is coupled to a reflective surface and an exterior strap attachment portion that is connected to a strap, and is shaped such that the mirror portion is adapted to be detachably mounted to an exterior of a door of a vehicle and the exterior strap attachment portion is adapted to be inserted into a window channel of the door. The interior component includes an interior strap attachment portion and a window frame portion, and is adapted to be inserted into the window channel and the window frame portion is adapted to be detachably mounted to a window frame of the door. The strap includes a first end connected to the exterior strap attachment portion and a second end connected to the interior strap attachment portion.

20 Claims, 6 Drawing Sheets

DETACHABLE REAR-VIEW MIRROR

CROSS-REFERENCE TO RELATED APPLICATION

This application claims the benefit of U.S. Provisional Application No. 62/562,868, filed Sep. 25, 2017 and titled "DETACHABLE REAR-VIEW MIRROR," which is incorporated by reference in its entirety.

FIELD

This specification relates to mirrors for vehicles.

BACKGROUND

Vehicles doors typically include at least a rear-view mirror on a door by the driver's seat. The rear-view mirror can be used by the driver so that the driver can see behind without needing to turn around. Using the rear-view mirror, a driver may be able to determine, without turning around, when it is safe to change lines, back up a vehicle, or exit a vehicle. However, vehicles typically don't include rear-view mirrors on doors for backseats of vehicle.

SUMMARY

In general, one innovative aspect of the subject matter described in this specification is embodied in a detachable rear-view mirror that includes an exterior component, an interior component, and a strap. The exterior component includes a mirror portion that is coupled to a reflective surface and an exterior strap attachment portion that is connected to a strap, and is shaped such that the mirror portion is adapted to be detachably mounted to an exterior of a door of a vehicle and the exterior strap attachment portion is adapted to be inserted into a window channel of the door. The interior component includes an interior strap attachment portion and a window frame portion, and is adapted to be inserted into the window channel and the window frame portion is adapted to be detachably mounted to a window frame of the door. The strap includes a first end connected to the exterior strap attachment portion and a second end connected to the interior strap attachment portion.

The foregoing and other embodiments can each optionally include one or more of the following features, alone or in combination. For instance, in certain aspects, pressure on the strap from a window of the vehicle in a closed position creates tension in the strap, where the tension in the strap helps keep the exterior component and the interior component in place. In some aspects, the exterior component is substantially U-shaped. In some implementations, the mirror portion is substantially parallel to the exterior strap attachment portion, and the exterior strap attachment portion and the mirror portion are coupled together by a connection portion that is substantially perpendicular to the mirror portion and the exterior strap attachment portion.

In certain aspects, the interior component is substantially L-shaped. In some aspects, the interior strap attachment portion is substantially perpendicular to the window frame portion. In some implementations, the exterior component and the interior component include a rigid material. In certain aspects, the strap includes a flexible fabric and a folding plastic insert. In some aspects, detachably mounted includes pressure mounted. In some aspects, the exterior component includes threads around an opening that is adapted to receive a screw with a tip that is rubber-coated and wider than a head of the screw. In some implementations, the interior component includes threads around an opening that is adapted to receive a screw with a tip that is rubber-coated and wider than a head of the screw.

In certain aspects, the exterior strap attachment portion includes a stopper crimp slot that keeps a crimp in the first end of the strap in place. In some implementations, the interior strap attachment portion includes a stopper crimp slot that keeps a crimp in the second end of the strap in place. In some aspects, the exterior component includes a socket coupled to the reflective surface and a ball coupled to the mirror portion, where the ball and the socket permit an angle of the reflective surface to be adjusted.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
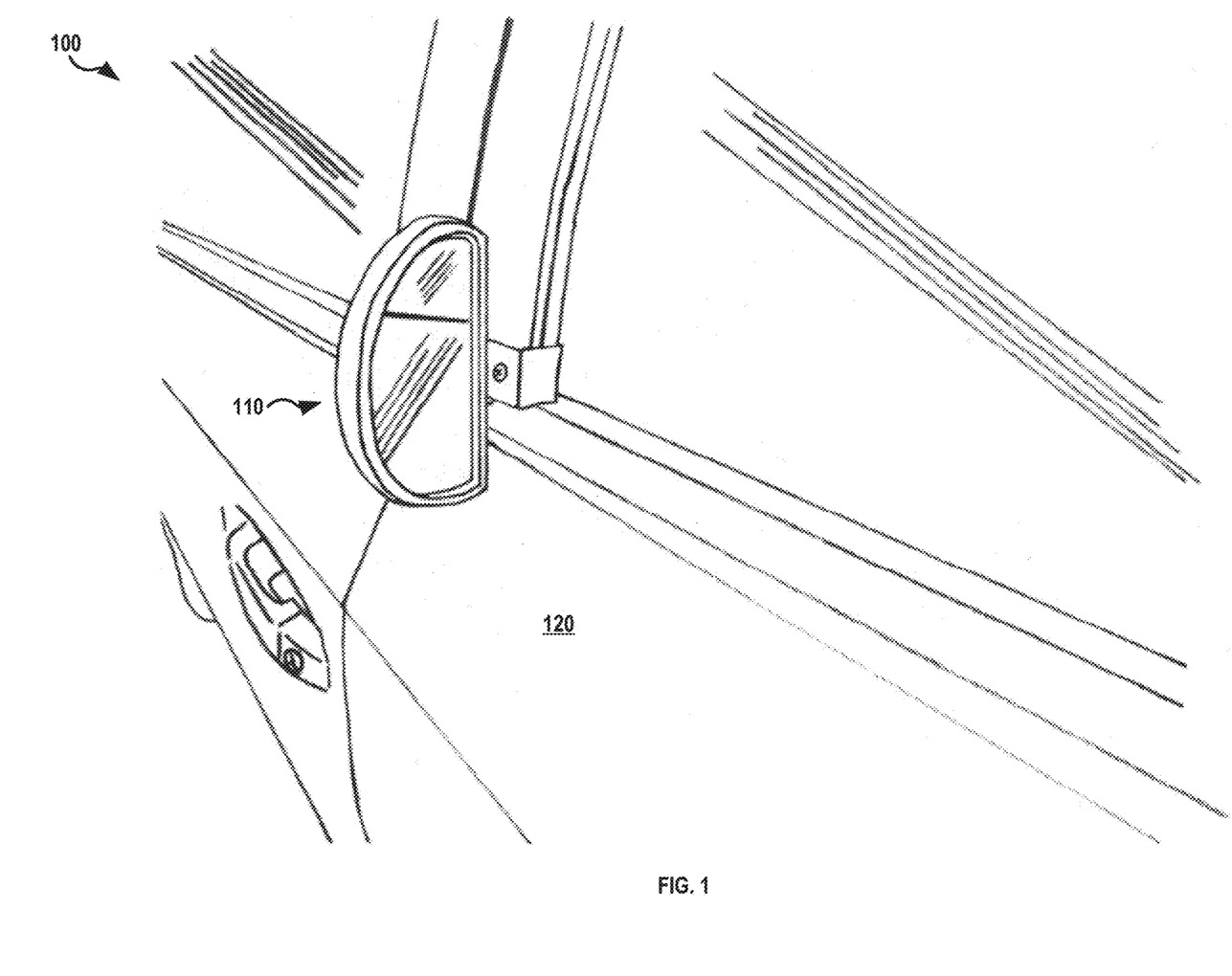
FIG. 1 illustrates an example of an environment with a detachable rear-view mirror as seen from outside a vehicle.

FIG. 1 illustrates an example of an environment 100 with a detachable rear-view mirror 110 as seen from outside a vehicle. The DM may be attached to a door frame 120 for a backseat of a vehicle. For example, as shown in FIG. 1, the DM may be attached near a front of a door frame of a driver side backseat door. A backseat of a vehicle may be a seat that is behind a driver seat. For example, the seat directly behind a driver's seat may be a backseat and the seat behind a seat adjacent to the driver's seat may also be a backseat. The door frame 120 of a door of a vehicle may be portions of the door that do not include window glass. For example, the door frame 120 may form rectangular shaped gap that the window glass may block when the window is closed and that the window glass may not block when the window is open.

Figure 2:
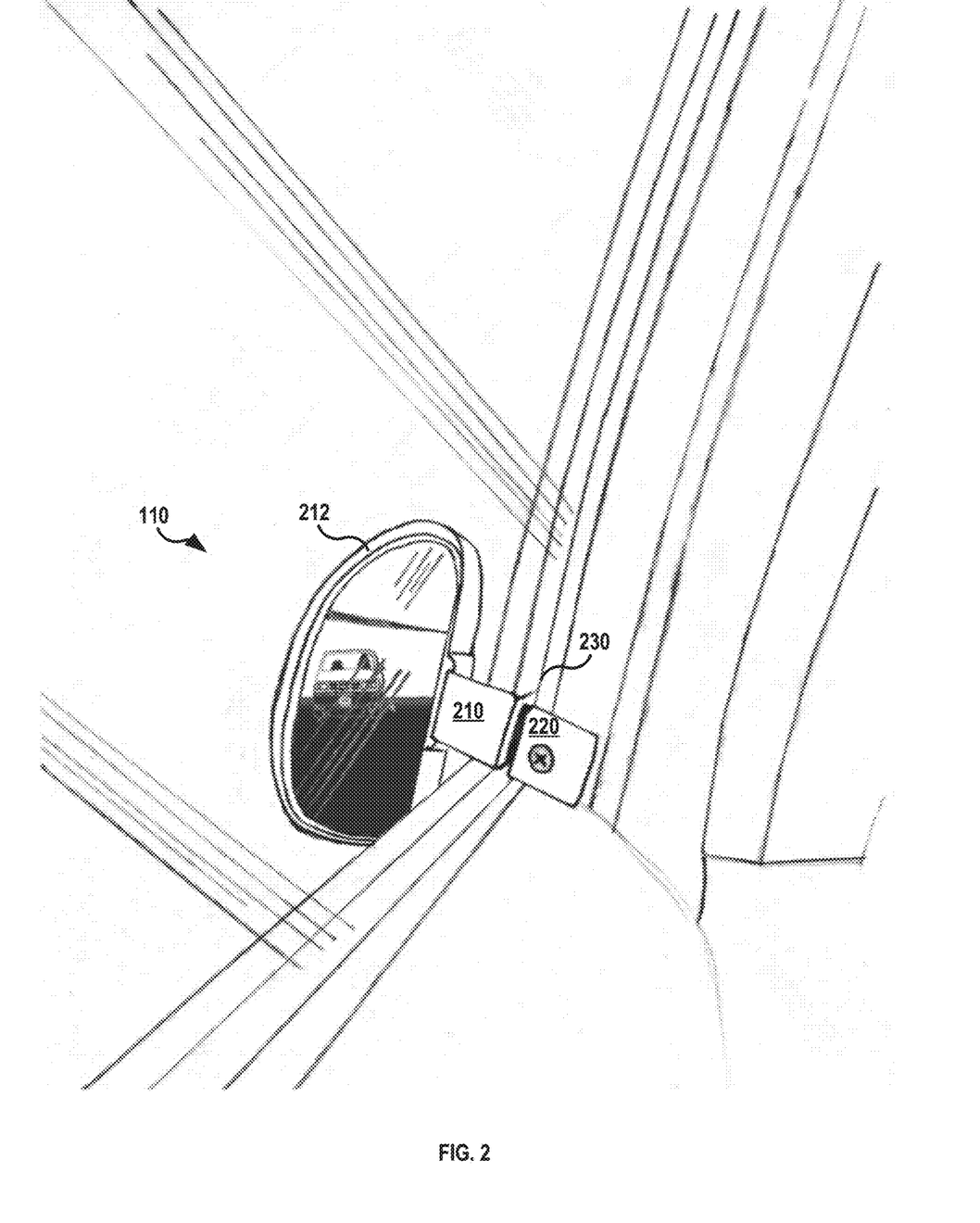
FIG. 2 illustrates an example of a detachable rear-view mirror as seen from inside a vehicle.

FIG. 2 illustrates an example of a detachable rear-view mirror 110 as seen from inside a vehicle. The DM may include an exterior component 210, a reflective surface 212, and an interior component 220. The exterior component 210 may be attached to an exterior of a door where part of the exterior component is inserted into a window channel 230 of a door. The window channel 230 of a door may be a vertical opening formed in the door where a window glass may slide up and down. For example, the front of a door frame may include a vertical window channel into which part of an exterior component 210 may be inserted. The interior component 220 may also be used to attach the DM to the door where part of the interior component 220 is also inserted into the window channel 230. When a window is closed, the exterior component 210 may be on the exterior side of the window glass and the interior component 220 may be on the interior side of the window glass. The interior side as referenced here may form the surface of the cabin of the vehicle and the exterior side as referenced here may form a surface of the outside of the vehicle.

The reflective surface 212 may be coupled to the exterior component 210 and allow a backseat passenger to have a rear-view without turning around. For example, the reflective surface 212 may show to a backseat passenger that another vehicle is behind the vehicle so the passenger may wait for the other vehicle to pass and then safely open the backseat door. Similarly, the reflective surface 212 may also show a bicyclist, a motorcyclist, or something else behind the vehicle.

Figure 3:
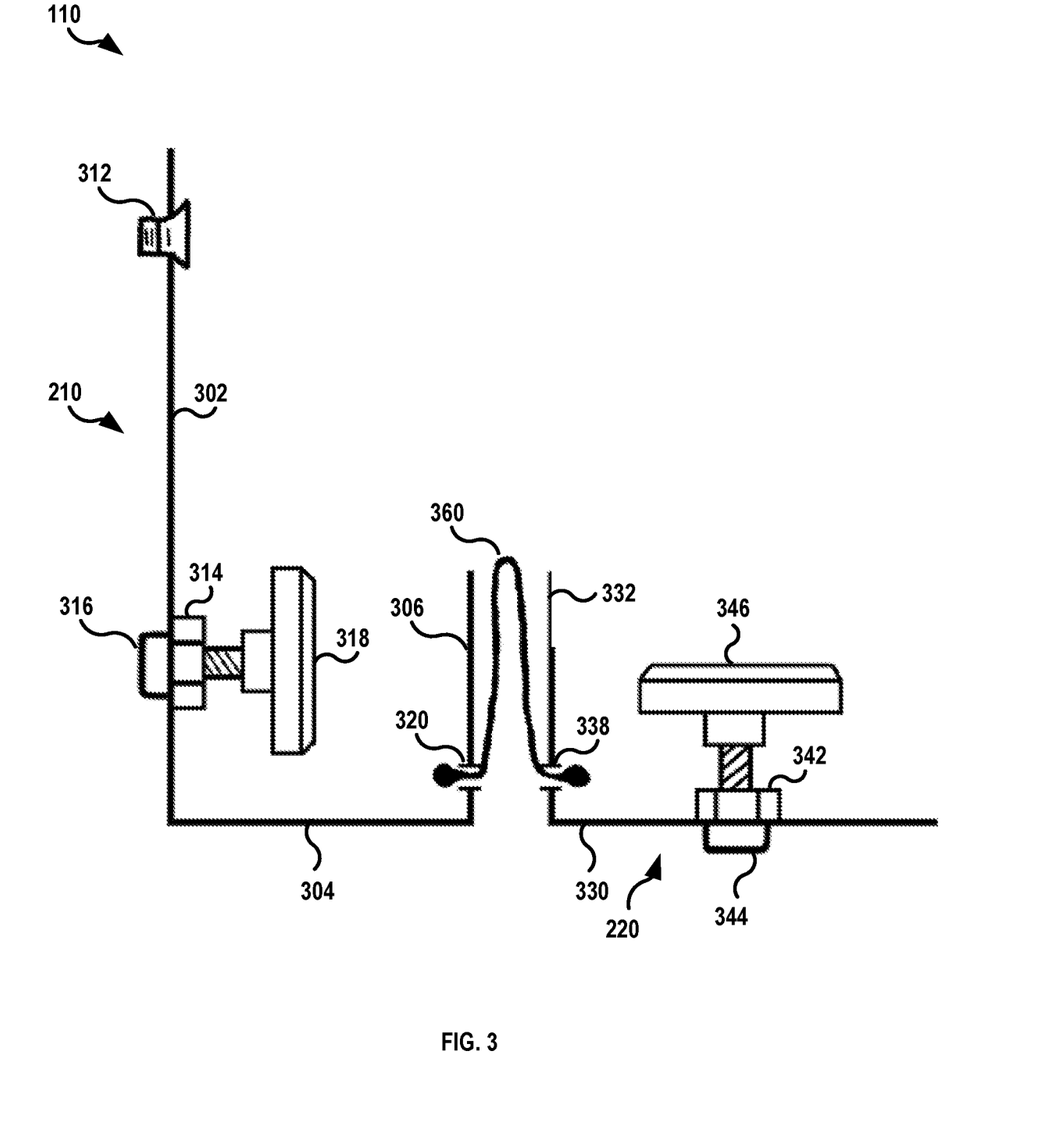
FIG. 3 illustrates an example side-view of a detachable rear-view mirror.

FIG. 3 illustrates an example side-view of a detachable rear-view mirror 110. The DM includes the exterior component 210 and the interior component 220 connected together by a strap 360. Pressure on the strap 360 from a window glass of the vehicle may create tension in the strap and the tension in the strap 360 may help keep the exterior component 210 and the interior component 220 in place.

The exterior component 210 may include a mirror portion 302 that is coupled to a reflective surface and an exterior strap attachment portion 306 this is connected to a strap 360. The mirror portion 302 may be coupled to the reflective surface through a fastener 312. The fastener 312 may be a screw, nail, or some other type of fastener that couples the mirror portion 302 and the reflective surface.

The exterior component 210 may be shaped such that the mirror portion 302 is adapted to be detachably mounted to an exterior of a door of a vehicle and the exterior strap attachment portion 306 may be adapted to be removably inserted into a window channel of a door of a vehicle. For example, the exterior component 210 may be substantially U-shaped. The mirror portion 302 may be substantially parallel to the exterior strap attachment portion 306, where the exterior strap attachment portion 306 and the mirror portion 302 are coupled together by a connection portion 304 that is substantially perpendicular to both the mirror portion and the exterior strap attachment portion. In some implementations, the mirror portion 302 may be approximately three inches long by one inch wide, the connection portion 304 may be approximately one inch by one inch, and the exterior strap attachment portion 306 may be approximately one inch by one inch.

The exterior component 210 may define an opening 314 that is adapted to receive a fastener 316. The exterior component 210 may include threads around the opening 314 where the fastener 316 is a screw. The fastener 316 may include a flat tip 318 that spreads pressure across a wide area so that the fastener 316 does not scratch or damage the exterior of the door. In some implementations, the fastener 316 may include a rubber-coated tip that is wider than a head of the fastener 316.

When the exterior component 210 is attached to a door, an installer may slide the exterior strap attachment portion 306 into a window channel of a door while sliding the mirror portion 302 along a portion of the exterior of the door. Once the exterior component 210 is in a correct position, the installer may then interact with the fastener 316 to apply pressure to the door frame to prevent the exterior component 210 from moving until someone interacts with the fastener 316 again.

The exterior strap attachment portion 306 may include a stopper crimp slot 320 that keeps a crimp in a first end of the strap 360 in place. The stopper crimp slot 320 may be positioned near a portion of the exterior strap attachment portion 306 closer to the connection portion 304 than the other end of the exterior strap attachment portion 306. The interior component 220 may include an interior strap attachment portion 322 and a window frame portion 330. The interior strap attachment portion 322 may be adapted to be inserted into the window channel of a door of a vehicle and the window frame portion 330 may be adapted to be detachable mounted to a window frame of the door of the vehicle. For example, the interior component 220 may be substantially L-shaped. The interior strap attachment portion 332 may be substantially perpendicular to the window frame portion 330. In some implementations, the interior strap attachment portion 332 may be approximately one inch by one inch and the window frame portion 330 may also be approximately one inch by one inch.

The interior component 220 may define an opening 342 that is adapted to receive a fastener 344. The interior component 220 may include threads around the opening 342 where the fastener 344 is a screw. The fastener 344 may include a flat tip 346 that spreads pressure across a wide area so that the fastener 344 does not scratch or damage an interior portion of the door frame. In some implementations, the fastener 344 may include a concave C-shaped tip, as the flat tip 346, that spreads pressure across a wide area in the case of a vehicle that has a curved interior doorframe, so that the fastener 344 does not scratch or damage the interior of the door. In some implementations, the flat tip 346 may include a rubber-coated tip that is wider than a head of the fastener 344.

When the interior component 220 is attached to a door, an installer may slide the interior strap attachment portion 322 into a window channel of a door while pushing the window frame portion 330 closer towards a portion of the door frame facing a passenger in a backseat. Once the interior component 220 is in a correct position, the installer may then interact with the fastener 346 to apply pressure to the door frame to prevent the interior component 220 from moving until someone interacts with the fastener 346 again.

The interior strap attachment portion 332 may include a stopper crimp slot 338 that keeps a crimp in a second end of the strap 360 in place. The stopper crimp slot 338 may be positioned near a portion of the interior strap attachment portion 332 closer to the window frame portion 330 than the other end of the interior strap attachment portion 332.

In some implementations, the DM may be detachably mounted because the DM is pressure mounted. For example, the DM may be considered to be pressure mounted because the fastener 316 and the exterior strap attachment portion 306 may sandwich a portion of the door between the window channel and an exterior of the door, where the fastener 316 may be adjusted to increase the sandwiching pressure so that movement of the exterior component 210 is reduced. Additionally or alternatively, the DM may be considered to be pressure mounted because tension in the strap 360 may keep the window frame portion 330 close to the door frame while the fastener 344 puts pressure against the door frame so that movement of the interior component 220 is reduced.

In some implementations the exterior component 210 and the interior component 220 may be formed from a rigid material. For example, the exterior component 210 and the interior component 220 may be formed of metal or hard plastic.

Figure 4:
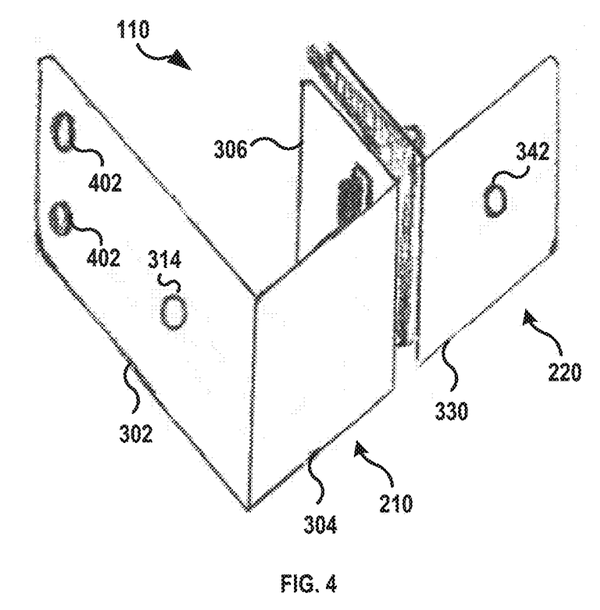
FIG. 4 illustrates an example isometric view of a detachable rear-view mirror.

FIG. 4 illustrates an example isometric view of a detachable rear-view mirror 110. The DM includes the exterior component 210 and the interior component 220 as previously described above in relation to FIG. 3. In FIG. 4, the exterior component 210 is shown as defining two opening 402 for fasteners 312 to couple the mirror portion 302 to the reflective surface 212.

Figure 5:
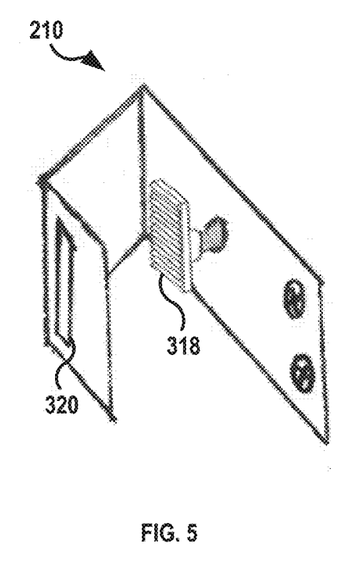
FIG. 5 illustrates an example isometric view of the exterior component of a detachable rear-view mirror.

FIG. 5 illustrates an example isometric view of the exterior component 210 of detachable a rear-view mirror. The flat tip 318 of the fastener 316 is shown as a square with grooves running across the square. However, the flat tip 318 may be other shapes. For example, the flat tip 318 may be a rectangle, an oval, a circle, or some other shape. FIG. 5 shows the stopper crimp slot 320 as a vertical slot that keeps a crimp in the strap in place.

Figure 6:
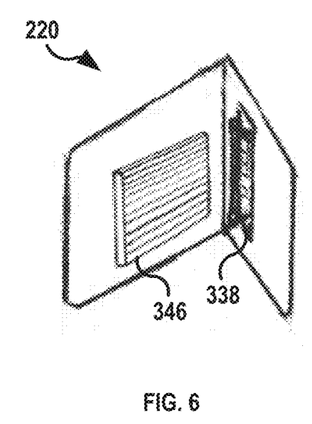
FIG. 6 illustrates an example isometric view of the interior component of a detachable rear-view mirror.

FIG. 6 illustrates an example isometric view of the interior component 220 of a detachable rear-view mirror. The flat tip 346 of the fastener 344 is shown as a square with grooves running across the square. However, the flat tip 346 may be other shapes. For example, the flat tip 346 may be a rectangle, an oval, a circle, or some other shape. FIG. 6 shows the stopper crimp slot 338 as a vertical slot that keeps a crimp in the strap in place.

Figure 7:
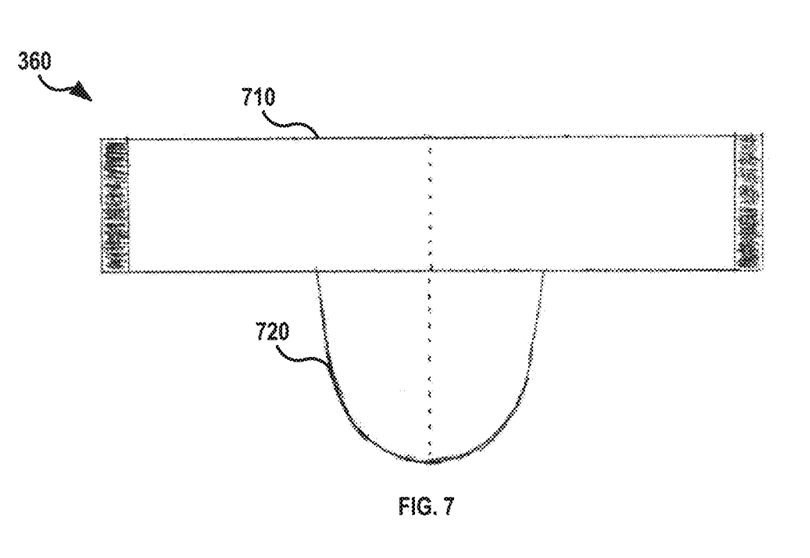
FIG. 7 illustrates an example view of the strap of a detachable rear-view mirror.

FIG. 7 illustrates an example view of the strap 360 of a detachable rear-view mirror. The strap 360 may include a head portion 710 and a tail portion 720. The head portion 710 may be approximately one inch by one inch and have one end attached to the stopper crimp slot 320 and another end attached to the other stopper crimp slot 338. The tail portion 720 may be attached to a bottom of the middle of the head portion 710 and be configured so that when the DM is attached to a door, the window glass pushes against the tail portion 720 so that the strap 360 is pushed and tightens to add pressure to keep the exterior component 210 and interior component 220 in place. The strap 360 may be made out of a flexible nylon or some other durable material that is flexible.

Figure 8:
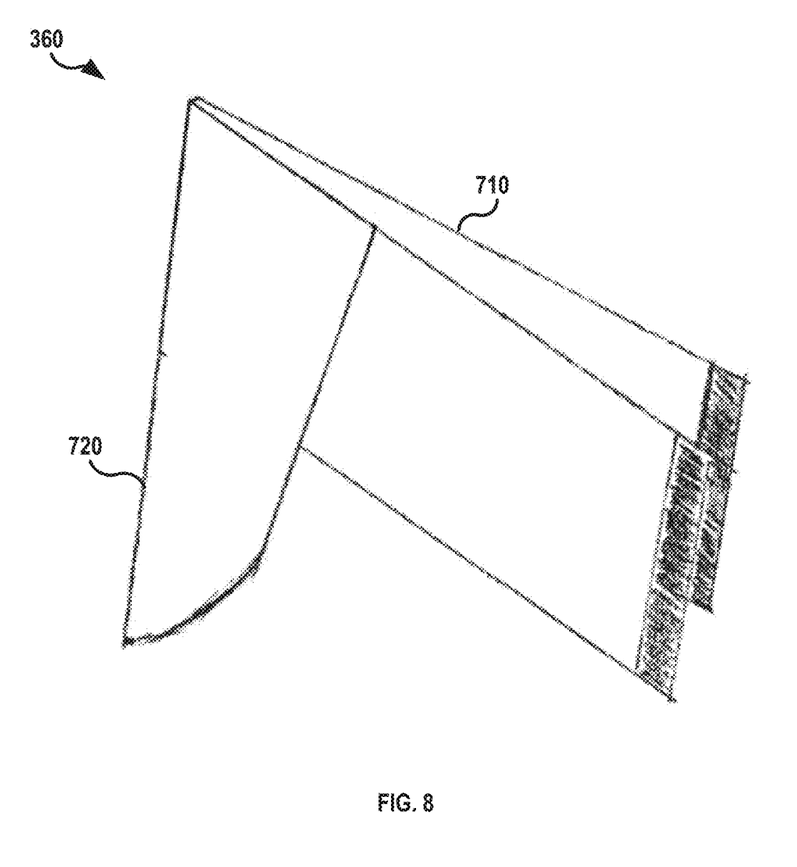
FIG. 8 illustrates an example isometric view of the strap of a detachable rear-view mirror where the strap is folded.

FIG. 8 illustrates an example isometric view of the strap 360 of a detachable rear-view mirror where the strap 360 is folded. In some implementations, when the DM is attached to a door and the window glass is raised the window glass pushes the strap 360 so that the strap 360 folds as shown in FIG. 8.

Figure 9A:
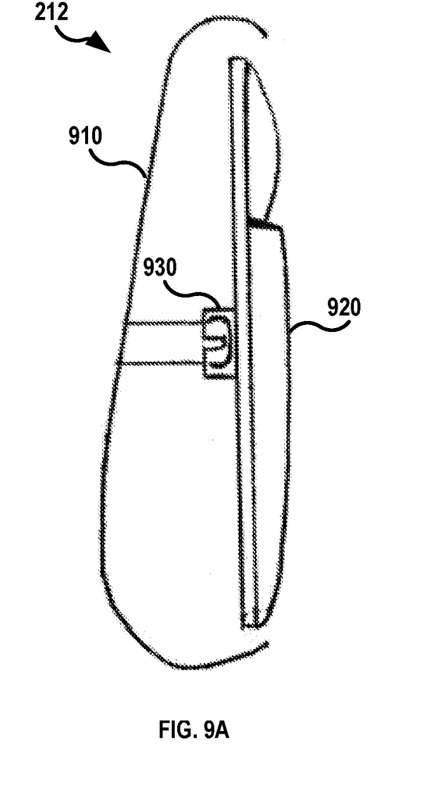
FIGS. 9A-9C illustrate example views of the reflective surface of a detachable rear-view mirror.
Figure 9B:
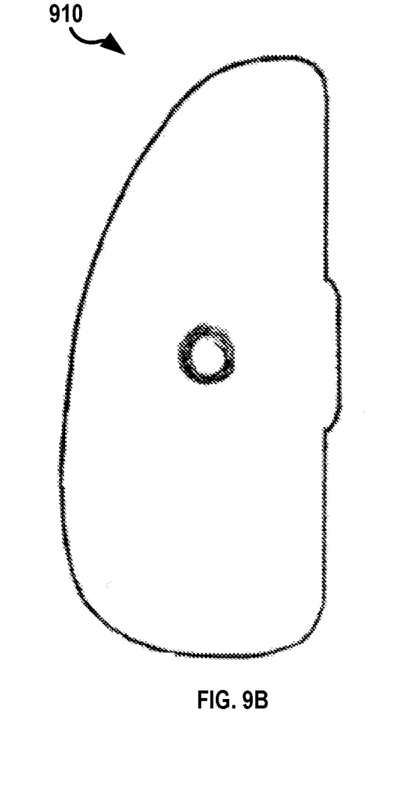
Figure 9C:
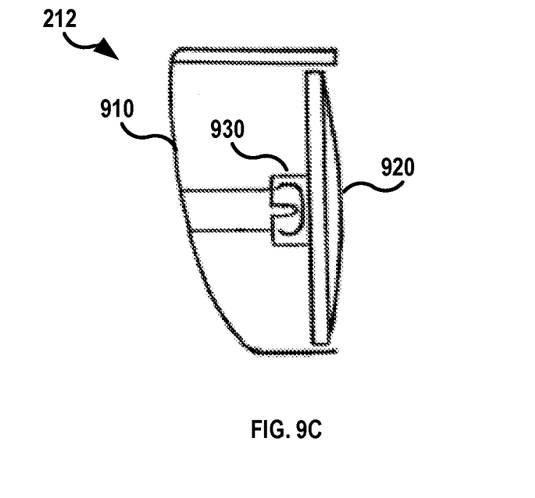

FIGS. 9A-9C illustrate example views of the reflective surface 212 of a detachable rear-view mirror. As shown in the side view of the reflective surface 212 in FIG. 9A, the reflective surface 212 may include a back portion 910, a ball and socket 930, and a mirror 920. As shown in the view of the back portion 910 in FIG. 9B, the back portion 910 may include a ball that receives a socket of the mirror 920 so that the mirror 920 may be moved around to different angles. FIG. 9C is a top view of the reflective surface 212 showing how the back portion 910, the ball and socket 930, and the mirror 920 appear from a top view.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Thus, though particular embodiments of the subject matter have been described. These, and other embodiments, may fall within the scope of the following claims.

What is claimed is:

1. A detachable rear-view mirror that comprises:
   an exterior component that includes a mirror portion that is coupled to a reflective surface and an exterior strap attachment portion that is connected to a strap, where the exterior component is shaped such that the mirror portion is adapted to be detachably mounted to an exterior of a door of a vehicle and the exterior strap attachment portion is adapted to be inserted into a window channel of the door of the vehicle;
   an interior component that includes an interior strap attachment portion and a window frame portion, where the interior strap attachment portion is adapted to be inserted into the window channel of the door of the vehicle and the window frame portion is adapted to be detachably mounted to a window frame of the door of the vehicle; and
   the strap with a first end connected to the exterior strap attachment portion and a second end connected to the interior strap attachment portion,
   wherein pressure on the strap from a window of the vehicle in a closed position creates tension in the strap, where the tension in the strap helps keep the exterior component and the interior component in place.

2. The detachable rear-view mirror of claim 1, wherein the exterior component is substantially U-shaped.

3. The detachable rear-view mirror of claim 1, wherein the mirror portion is substantially parallel to the exterior strap attachment portion, and the exterior strap attachment portion and the mirror portion are coupled together by a connection portion that is substantially perpendicular to the mirror portion and the exterior strap attachment portion.

4. The detachable rear-view mirror of claim 1, wherein the interior component is substantially L-shaped.

5. The detachable rear-view mirror of claim 1, wherein the interior strap attachment portion is substantially perpendicular to the window frame portion.

6. The detachable rear-view mirror of claim 1, wherein the exterior component and the interior component comprise a rigid material.

7. The detachable rear-view mirror of claim 1, wherein the strap comprises a flexible fabric and a folding plastic insert.

8. The detachable rear-view mirror of claim 1, wherein detachably mounted comprises pressure mounted.

9. The detachable rear-view mirror of claim 8, wherein the exterior component comprises threads around an opening that is adapted to receive a screw with a tip that is rubber-coated and wider than a head of the screw.

10. The detachable rear-view mirror of claim 8, wherein the interior component comprises threads around an opening that is adapted to receive a screw with a tip that is rubber-coated and wider than a head of the screw.

11. The detachable rear-view mirror of claim 1, wherein the exterior strap attachment portion comprises a stopper crimp slot that keeps a crimp in the first end of the strap in place.

12. The detachable rear-view mirror of claim 1, wherein the interior strap attachment portion comprises a stopper crimp slot that keeps a crimp in the second end of the strap in place.

13. The detachable rear-view mirror of claim 1, wherein the exterior component comprises a socket coupled to the reflective surface and a ball coupled to the mirror portion, wherein the ball and the socket permit an angle of the reflective surface to be adjusted.

14. A detachable rear-view mirror that comprises:
an exterior component that includes a mirror portion that is coupled to a reflective surface and an exterior strap attachment portion that is connected to a strap, where the exterior component is shaped such that the mirror portion is adapted to be detachably mounted to an exterior of a door of a vehicle and the exterior strap attachment portion is adapted to be inserted into a window channel of the door of the vehicle;
an interior component that includes an interior strap attachment portion and a window frame portion, where the interior strap attachment portion is adapted to be inserted into the window channel of the door of the vehicle and the window frame portion is adapted to be detachably mounted to a window frame of the door of the vehicle; and
the strap with a first end connected to the exterior strap attachment portion and a second end connected to the interior strap attachment portion,
wherein the strap comprises a flexible fabric and a folding plastic insert.

15. The detachable rear-view mirror of claim 14, wherein pressure on the strap from a window of the vehicle in a closed position creates tension in the strap, where the tension in the strap helps keep the exterior component and the interior component in place.

16. The detachable rear-view mirror of claim 14, wherein the exterior component comprises threads around an opening that is adapted to receive a screw with a tip that is rubber-coated and wider than a head of the screw.

17. A detachable rear-view mirror that comprises:
an exterior component that includes a mirror portion that is coupled to a reflective surface and an exterior strap attachment portion that is connected to a strap, where the exterior component is shaped such that the mirror portion is adapted to be detachably mounted to an exterior of a door of a vehicle and the exterior strap attachment portion is adapted to be inserted into a window channel of the door of the vehicle;
an interior component that includes an interior strap attachment portion and a window frame portion, where the interior strap attachment portion is adapted to be inserted into the window channel of the door of the vehicle and the window frame portion is adapted to be detachably mounted to a window frame of the door of the vehicle; and
the strap with a first end connected to the exterior strap attachment portion and a second end connected to the interior strap attachment portion,
wherein detachably mounted comprises pressure mounted, and
wherein the exterior component comprises threads around an opening that is adapted to receive a screw with a tip that is rubber-coated and wider than a head of the screw.

18. The detachable rear-view mirror of claim 17, wherein pressure on the strap from a window of the vehicle in a closed position creates tension in the strap, where the tension in the strap helps keep the exterior component and the interior component in place.

19. The detachable rear-view mirror claim 17, wherein the strap comprises a flexible fabric and a folding plastic insert.

20. The detachable rear-view mirror of claim 17, wherein the interior component comprises threads around an opening that is adapted to receive a screw with a tip that is rubber-coated and wider than a head of the screw.

* * * * *